United States Patent [19]
Zuckerwar et al.

[11] Patent Number: 5,146,780
[45] Date of Patent: Sep. 15, 1992

[54] VACUUM-ISOLATION VESSEL AND METHOD FOR MEASUREMENT OF THERMAL NOISE IN MICROPHONES

[75] Inventors: Allan J. Zuckerwar; Kim Chi T. Ngo, both of Newport News, Va.

[73] Assignee: The Administrator of the National Aeronautics and Space Administration, Washington, D.C.

[21] Appl. No.: 773,376

[22] Filed: Oct. 7, 1991

[51] Int. Cl.$^5$ ............................................. G01K 7/30
[52] U.S. Cl. .................................... 374/175; 73/1 H; 73/571
[58] Field of Search ............................ 374/175; 73/571

[56] References Cited

U.S. PATENT DOCUMENTS

| | | | |
|---|---|---|---|
| 2,847,643 | 8/1958 | De Boisblanc | 374/175 X |
| 3,049,913 | 8/1962 | Hunt | 73/571 |
| 3,104,543 | 9/1963 | Kaminski . | |
| 3,229,509 | 1/1966 | Darby | 73/571 |
| 3,698,241 | 10/1972 | Bouclin . | |
| 3,827,288 | 8/1974 | Fletcher et al. . | |
| 3,878,723 | 4/1975 | Blalock et al. . | |
| 3,890,841 | 6/1975 | Brixy . | |
| 3,937,086 | 2/1976 | von Thuna . | |
| 3,966,500 | 6/1976 | Brixy | 374/175 |
| 4,028,932 | 6/1977 | Rosencwaig | 73/571 X |
| 4,142,403 | 3/1979 | Lohnes et al. | 73/76 |
| 4,233,843 | 11/1980 | Thompson et al. . | |
| 4,380,930 | 4/1983 | Podhrasky et al. | 73/571 X |
| 4,627,744 | 12/1986 | Brixy et al. . | |
| 4,706,259 | 11/1987 | Paros et al. . | |
| 4,911,009 | 3/1990 | Maeda et al. | 374/175 |

Primary Examiner—Daniel M. Yasich
Attorney, Agent, or Firm—Kevin B. Osborne

[57] ABSTRACT

A vacuum-isolation vessel for measurement of thermal noise in microphones has an outer vessel and an inner vessel suspended within the outer vessel. A high vacuum is created between the inner and outer vessels to provide acoustical isolation. The suspension assembly coupled between the inner and outer vessels provides a substantially vibration-free environment. Thus, thermal noise in a microphone mounted within the inner vessel is accurately measured, especially at low thermal noise levels and at low frequencies.

28 Claims, 3 Drawing Sheets

VACUUM-ISOLATION VESSEL AND METHOD FOR MEASUREMENT OF THERMAL NOISE IN MICROPHONES

ORIGIN OF THE INVENTION

The invention described herein was jointly made in the performance of work under a NASA contract and by an employee of the United States government. In accordance with 35 U.S.C. §202, the contractor elected not to retain title.

BACKGROUND OF THE INVENTION

1. Field of the Invention

The present invention relates to an apparatus and method for measuring thermal noise. In particular, the present invention provides a vacuum-isolation vessel for use in measuring thermal noise in a microphone disposed within the vessel.

2. Discussion of the Related Art

The term "thermal noise" denotes the output signal of a microphone, in the absence of incident sound, due to stochastic processes such as the Brownian motion of air molecules impinging upon the microphone membrane or the Johnson noise generated in a microphone preamplifier. Measurement of the thermal noise is impeded by the difficulty of isolating the microphone from the ever present sounds and vibrations in the environment. The thermal noise is an important specification because it determines the minimum detectable sound pressure by the microphone.

Prior methods for determining the thermal noise in microphones include use of the conventional isolation vessel, the anechoic chamber, and the dummy microphone. The conventional isolation vessel contains massive walls to isolate an interior microphone from exterior environmental sound. The anechoic chamber, a room large enough to contain the entire noise measurement system, utilizes sound-absorbing wedges on its walls to ensure a quiet environment. The dummy microphone contains a fixed capacitor as a substitute for the microphone cartridge and is thus insensitive to incident sound.

The acoustical isolation provided by both the conventional isolation vessel and the anechoic chamber fails at low frequencies, typically below several hundred Hz for the former and below 40-100 Hz for the latter. The dummy microphone yields a false indication of thermal noise because it excludes the Brownian motion component and introduces additional components of noise not found in the microphone.

U.S. Pat. No. 3,104,543 to Kaminski discloses an acoustical vibration test device which utilizes an isolation chamber with inner and outer vessels. However, the inner vessel is not vibrationally isolated from the outer vessel causing the inner vessel to reverberate. This is suitable for testing the effect of noise on test objects but not for measuring thermal noise.

Another test apparatus is disclosed by U.S. Pat. No. 3,827,288 to Fletcher et al. which also utilizes a reverberant acoustic chamber that does not isolate a test object vibrationally.

U.S. Pat. No. 3,698,241 to Bouclin discloses a method for vibrational testing in which a test object is suspended within a vessel. However, the vessel is not acoustically isolated.

Conventional isolation apparatus and methods have been unable to provide an acoustically quiet and vibration-free environment for accurately measuring thermal noise.

OBJECTS AND SUMMARY OF THE INVENTION

An object of the present invention is to provide an apparatus which can be used for accurate measurement of the thermal noise in a microphone.

Another object of the present invention is to provide an apparatus which can be used for accurate measurement of thermal noise in a microphone at low frequencies.

A further object of the present invention is to provide an apparatus which effectively isolates a microphone and results in an acoustically quiet and vibration-free environment.

An additional object of the present invention is to provide an apparatus which may be calibrated in situ.

Another object of the present invention is to provide a method for accurately measuring thermal noise in a microphone.

These and other objects of the present invention are achieved by enclosing the microphone in a vessel which is isolated from the environment, acoustically by a high vacuum and vibrationally by an effective suspension system. Electrical isolation may also be provided. An apparatus for measuring thermal noise comprises an isolation vessel assembly, a noise measurement system for recording noise data from the isolation vessel assembly, and a vacuum source for creating a vacuum in the isolation vessel assembly.

The isolation vessel assembly comprises a vacuum-sealed outer vessel, a vacuum-sealed inner vessel and an interior suspension assembly coupled between the outer and inner vessels for suspending the inner vessel within the outer vessel. A vacuum is created between the internal surface of the outer vessel and the external surface of the inner vessel.

The method of measuring thermal noise in a microphone comprises the steps of mounting a microphone in an inner vessel of an isolation vessel assembly, vacuum sealing the inner vessel, suspending the inner vessel within an outer vessel of the isolation vessel assembly and forming a chamber between the inner and outer vessels, and measuring the thermal noise data in the microphone.

The method also includes calibrating the microphone in situ before taking the thermal noise measurement.

BRIEF DESCRIPTION OF THE DRAWINGS

The invention is described in detail with reference to the following drawings in which like reference numerals refer to like elements and wherein.

DETAILED DESCRIPTION OF THE PREFERRED EMBODIMENTS

The terms herein, such as bottom, top, lower and upper, are used for descriptive purposes only and are not intended to have a limiting effect.

The apparatus for measuring thermal noise according to the present invention comprises an isolation vessel assembly including a vacuum-sealed outer vessel, a vacuum-sealed inner vessel and an interior suspension assembly coupled between the outer and inner vessels for suspending the inner vessel within the outer vessel. The apparatus also includes a noise measurement system for recording thermal noise data from the isolation vessel assembly and a vacuum system for creating a vacuum between an internal surface of the outer vessel and an external surface of the inner vessel.

A service system may be provided for monitoring pressure and temperature in the isolation vessel assembly. First and second electrical feedthrough assemblies electrically couple and vacuum seal the noise measurement system components and service system components located within the inner vessel to instrumentation outside the isolation vessel assembly.

The inner vessel is suspended within the outer vessel by a structure which suppresses the transfer of vibrations from the outer vessel to the inner vessel. An exterior suspension assembly may also be provided to reduce vibrations received by the isolation vessel assembly from the surrounding environment.

The method of measuring thermal noise in a microphone includes mounting a microphone in the inner vessel of the isolation vessel assembly and vacuum sealing the inner vessel. The inner vessel is then suspended within the outer vessel of the isolation vessel assembly, and a chamber is formed between the exterior surface of the inner vessel and the interior surface of the outer vessel. The outer vessel is vacuum-sealed, and the chamber between the vessels is evacuated. The microphone is then acoustically and vibrationally isolated, and the thermal noise is measured.

The method also includes calibrating the microphone before thermal noise measurement by removing the outer walls of the inner and outer vessels and inserting the microphone into a calibrator to measure the output of the microphone.

Figure 1:
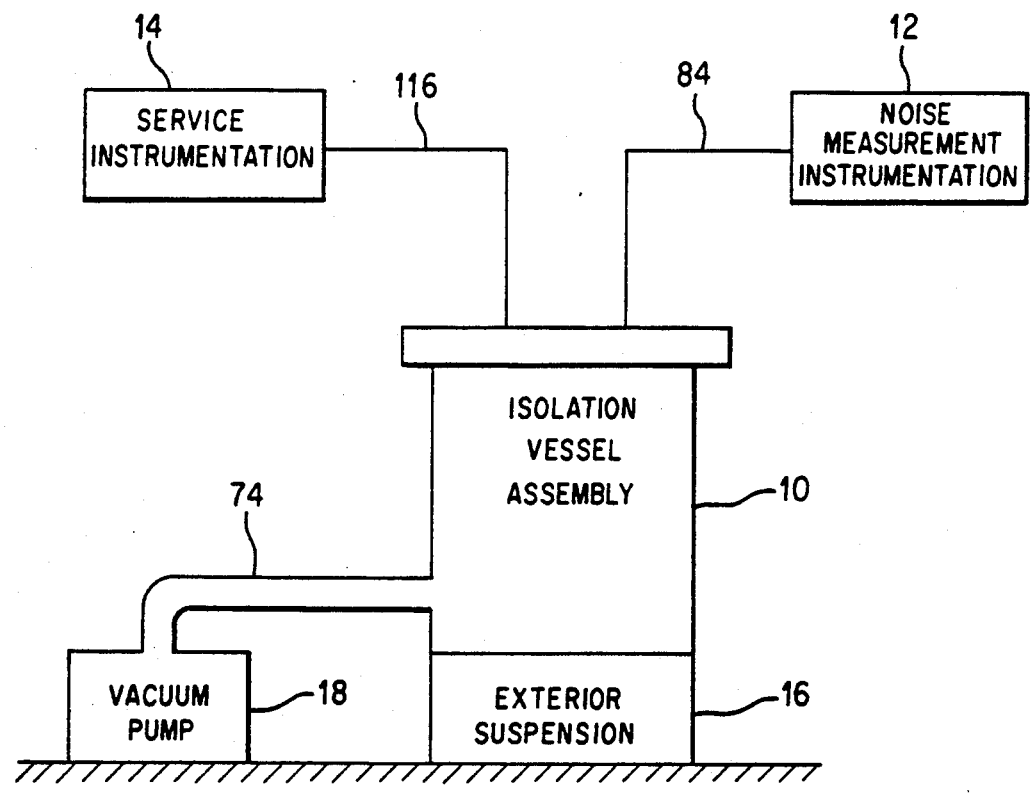
FIG. 1 is a schematic diagram of apparatus for measuring thermal noise according to the present invention.

The apparatus for measuring thermal noise shown in FIG. 1 comprises an isolation vessel assembly 10, noise measurement instrumentation 12, service instrumentation 14, an exterior suspension assembly 16, and a vacuum pump 18.

Figure 2:
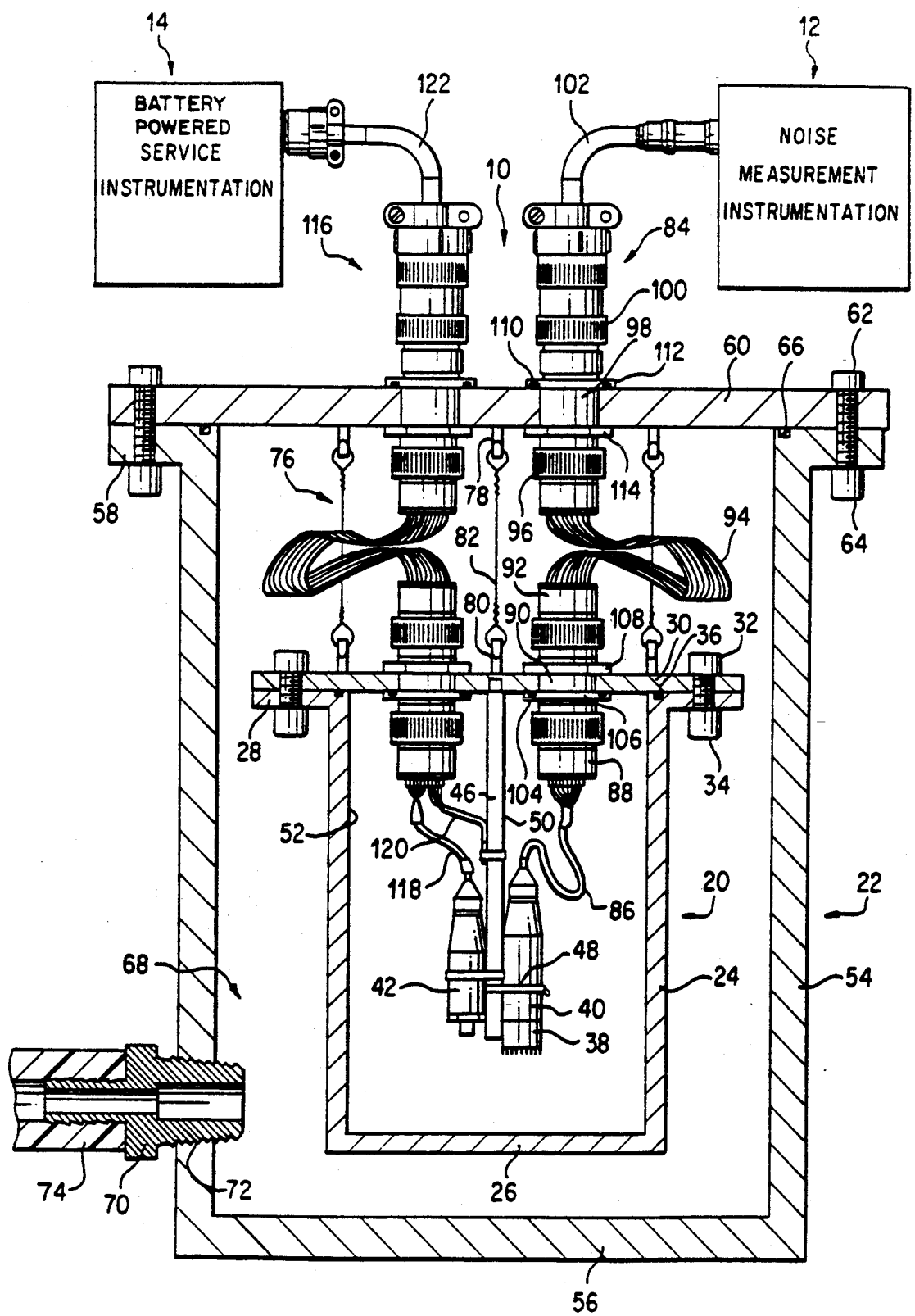
FIG. 2 is an enlarged side view in partial section of an isolation vessel assembly according to the present invention.

The isolation vessel assembly 10 illustrated in detail in FIG. 2 comprises an inner vessel 20, an outer vessel 22, an electrical feedthrough assembly 84, and an interior suspension assembly 76.

The inner vessel 20 is a sealed container which is substantially impervious to external vacuum. As shown in FIG. 2, it may have a continuous outer wall 24 which extends between a bottom 26 and, preferably, an upper annular flange 28. Upper flange 28 can be configured as a unitary flange or a plurality of radially extending tabs. A top plate 30 is secured to inner vessel 20, for example by being secured to flange 28 by several bolts 32 and nuts 34. A seal, preferably in the form of a resilient O-ring 36 provided in a groove in flange 28 and abutting top plate 30, is provided for vacuum sealing the interior of inner vessel 20. The pressure inside the inner vessel 20 may remain nominally at ambient pressure (e.g., about one atmosphere) at all times, or may be adjusted to pressure conditions determined by the anticipated operating conditions of a given microphone being tested.

Inner vessel 20 contains a test microphone 38 and preamplifier 40. It preferably also contains service sensors such as a static pressure transducer 42 and a thermometer 44. The contents of the inner vessel are stabilized, preferably by being strapped to a mounting post 46 by insulating tie down straps 48.

Mounting post 46 extends from top plate 30 into the chamber of inner vessel 20. It preferably has an insulating sleeve 50 formed of a dielectric material to prevent electrical contact between the mounted sensors and mounting member or post 46. Alternatively, the post itself may be made of an insulating material. An insulating liner 52 made of dielectric material is preferably disposed within inner vessel 20 on the inside face of wall 24 and bottom 26 to prevent electrical contact between the mounted sensors and the interior of inner vessel 20.

Outer vessel 22 is a sealed container which is substantially impervious to internal vacuum. As shown in FIG. 2, it may include an outer wall 54 extending from bottom 56 and preferably has an annular flange 58 extending therefrom. Annular flange 58 can be continuous or configured as a plurality of radial tabs extending from outer wall 54. A top plate 60 is secured to outer vessel 22, for example by being secured to flange 58 by several bolts 62 and nuts 64. A seal, preferably in the form of a resilient O-ring 66 disposed within a groove in flange 58, is located between wall 54 and top plate 60 to provide a vacuum seal.

Inner vessel 20 is suspended within outer vessel 22. Outer vessel 22 is large enough to contain inner vessel 20 without any wall to wall contact. A vacuum chamber 68 is created between the external surface of inner vessel 20 and the internal surface of outer vessel 22, and a system is provided for evacuating chamber 68.

As shown in FIG. 2, a nozzle 70 is coupled between outer vessel 22 and vacuum pump 18. Nozzle 70 preferably has external threads 72, and penetrates wall 54 of outer vessel 22 to make a vacuum-tight seal. A flexible hose 74 may connect nozzle 70 to vacuum pump 18. The chamber 68, created between inner vessel 20 and outer vessel 22, is evacuated by pump 18. Creating a high vacuum in chamber 68, corresponding to a pressure of no more than about $10^{-5}$ Torr, suppresses the transmission of sound from the environment into the interior of inner vessel 20.

Both the inner vessel 20 and the outer vessel 22 are preferably made of one or more materials which exhibit at least the first of the following three desirable properties, and preferably all of them: (1) sufficient strength to resist the pressures caused by evacuating the isolation volume (i.e., chamber 68); (2) sufficient electrical conductivity to permit the vessels to act as a "Faraday Cage" and thus suppress electromagnetic interference; and (3) good corrosion resistance. An example of a suitable material is stainless steel, for example type 304. Typical dimensions for the outer vessel are $7\frac{1}{4}''$ inner diameter $\times 12''$ height $\times \frac{1}{2}''$ wall thickness; corresponding typical dimensions for the inner vessel are $4'' \times 7'' \times \frac{1}{4}''$, respectively. Of course, the selection of dimensions for a particular apparatus would depend on numerous factors.

Inner vessel 20 is suspended within outer vessel 22 by an interior suspension assembly which isolates inner vessel 20 against vibration. As shown in FIG. 2, a preferred suspension assembly 76 includes three equally spaced hooks 78 mounted on the interior side of the outer vessel top plate 60, three similar hooks 80 mounted on the exterior side of the inner vessel top plate 30, and three suspension wires 82 attached to corresponding pairs of hooks. The suspension wires 82 and inner vessel 20 constitute a mechanical filter, the wires 82 serving as a spring and the inner vessel 20 and contents serving as a mass. The filter suppresses vibrations at all frequencies except the resonant frequency of the spring-mass system, that is, of the suspension wire-inner vessel system. If the suspension wires 82 are made as thin as possible, consistent with the strength required to support the inner vessel 20, then the resonant frequency can be made very low, typically on the order of 30 Hz. Thermal noise measurements at this frequency may yield an erroneous result and are preferably excluded.

In order to augment the suppression of vibrations from the environment, the entire isolation vessel assembly 10 may be seated upon an exterior suspension assembly 16, shown in FIG. 1, which may for example take the form of a commercially available pneumatic vibration isolation table or a common inner tube, inflated to a pressure capable of supporting the weight of the isolation vessel assembly 10.

The electrical feedthrough assembly 84 provides a vacuum-sealed electrical connection between the interior test apparatus and sensors 38, 40, 42 and 44, and the exterior noise measurement test instrumentation 12 and service instrumentation 14. In order to suppress possible interference, separate channels are preferably provided for the test and service instrumentation. Since the feedthrough assemblies for both channels shown in FIG. 2 are identical, only the test microphone channel will be described in detail.

The test microphone channel shown in FIG. 2 comprises a preamplifier cable 86, an internal connector 88, an electrical feedthrough 90, an external connector 92, wiring 94, an internal connector 96, an electrical feedthrough 98, an external connector 100, and a test instrumentation cable 102. The preamplifier cable 86 provides the coupling for mounting the microphone to be tested.

Feedthrough 90 has two functions: 1) to conduct electrical signals through the inner vessel top plate 30, and 2) to provide sealing against the high vacuum. An example of a suitable feedthrough is the Cannon ITT Model TBFH-100 jam nut-mounted through-bulkhead receptacle. The bulkhead is sealed by an O-ring 104, which is compressed between the top plate 30 and receptacle flange 106 by means of a jam nut 108. A corresponding feedthrough 98 performs these functions at the outer vessel top plate 60. In both cases, the O-rings 104 and 110 and flanges 106 and 112 are preferably located on the pressure side of the top plates 30 and 60, and the jam nuts 108 and 114 on the vacuum side, so that the atmospheric pressure which prevails within the inner vessel 20 and outside the outer vessel 22 reinforces the compression of the O-ring seals.

Connector 88 provides an electrical connection between feedthrough 90 and microphone cable 86. Connector 100 connects feedthrough 98 to test instrumentation cable 102. Connectors 92 and 96 provide an electrical connection between the two feedthroughs 90 and 98 through wiring 94. The insulation used on wiring 94 must be suitable for service in high vacuum, for example Teflon coated hookup wire. Examples of connectors compatible with feedthroughs 90 and 98 are ITT Cannon connectors MS3106A. The pins and sockets of the feedthrough and connectors may preferably be gold-plated to reduce contact noise.

The second electrical feedthrough system 116 for the service instrumentation channel is preferably identical to that of the test instrumentation channel, except that the terminal connections are made to the pressure transducer cable 118, the thermometer cable 120, and the service instrumentation cable 122 respectively. The service instrumentation 14 is preferably battery powered to avoid possible interference from signals at the line power frequency.

Prior to any measurement of thermal noise in microphone 38, a calibration of the microphone cartridge 38 should be performed to determine the sensitivity of the microphone, usually expressed in units of volts/Pascal. Then the thermal noise voltage can be converted to equivalent sound pressure units (Pascals).

Figure 3:
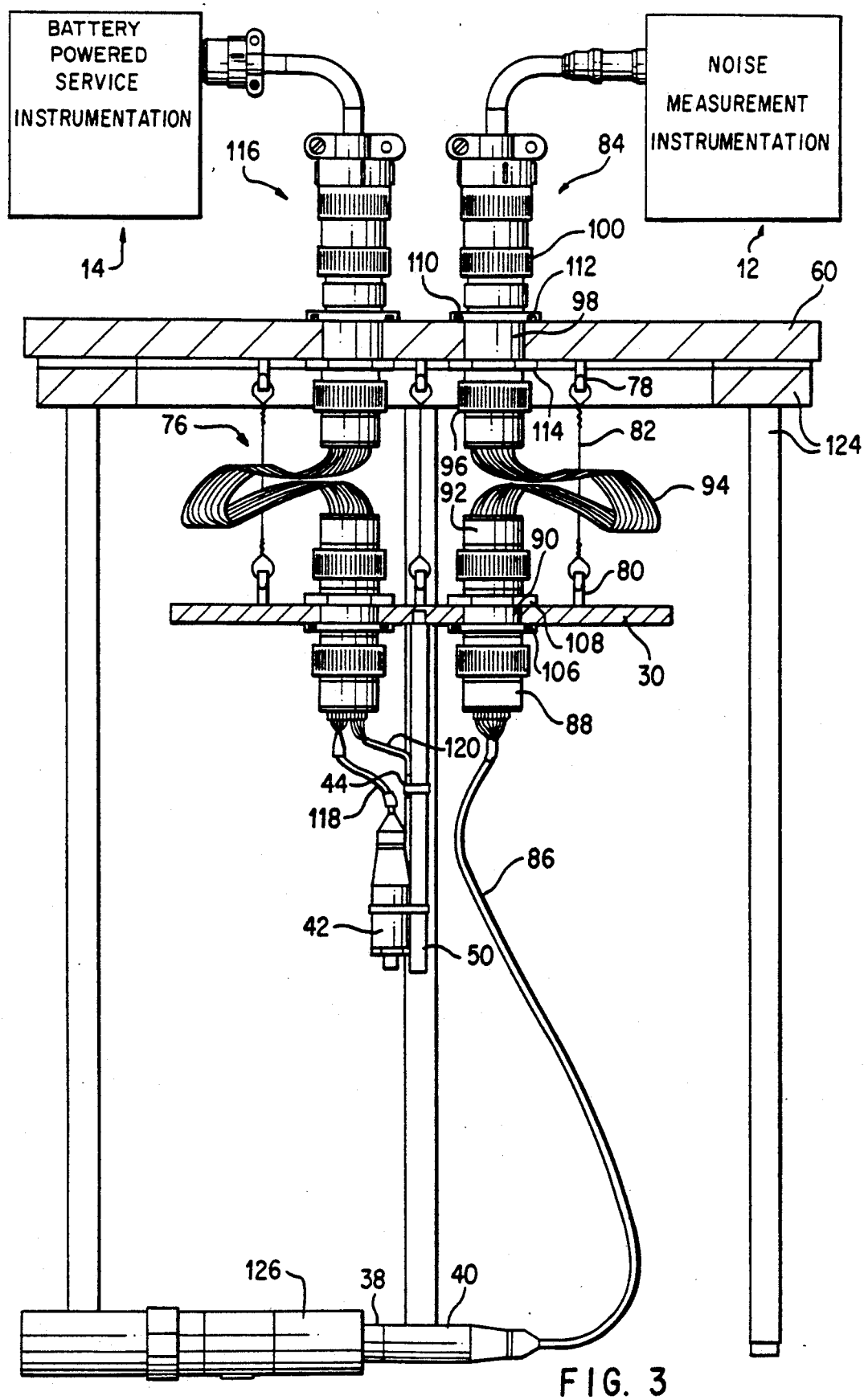
FIG. 3 is an enlarged side view and partial section of the isolation vessel assembly shown in FIG. 2, modified for calibration.

A system for calibrating the microphone cartridge 38, shown in FIG. 3, is similar to the system shown in FIG. 2 except that the inner vessel wall 24 and outer vessel wall 54 are removed. The top plate 60 of the outer vessel 22 may be seated upon a ring stand 124. The microphone cartridge 38 is inserted into a calibrator 126, for example, a Bruel & Kjaer type 4220 pistonphone, which produces a sound pressure level of 124 dB re $20\mu$ Pa at 250 Hz. The output of the microphone is measured on the noise measurement instrumentation 12, which may be a narrow band voltmeter or any instrument capable of measuring the output power within a given bandwidth, that is, the power spectral density. An example of such an instrument is the Bruel & Kjaer Dual Signal Analyzer Type 2032. Such an in situ calibration procedure has the advantage that the calibration takes place through the same cabling and electrical connection as used in the thermal noise measurement.

To accomplish a thermal noise measurement, the test microphone 38 and preamplifier 40 are mounted, and the system is assembled as shown in FIG. 2. The measurement cable 102 is connected to the noise measurement instrumentation 12. The vacuum pump 18 is turned on to evacuate the isolation chamber 68 to a recommended vacuum of at least $10^{-5}$ Torr. During the time that the thermal noise data is being recorded on the noise measurement instrumentation 12, it is necessary to turn off the vacuum pump to achieve a vibration free environment. The system should be capable of maintaining the test vacuum during the entire time measurement interval.

During the thermal noise measurement, the service instrumentation 14 is operated to monitor the pressure and temperature inside the inner vessel 20. Suitable sensors for performing these measurements are, for example, a Druck Model PDCR9200 for the pressure sensor 42, and a Minco Platinum Resistance Thermometer Model S-202 for the temperature sensor 44. A leak in the inner vessel 20 can be detected by means of decreasing pressure readings on pressure sensor 42. The temperature reading is needed for the evaluation of most sources of thermal noise. The noise measurement instrumentation 12 may be a narrow band voltmeter or any instrument capable of measuring the output power within a given bandwidth or the power spectral density, such as a Bruel & Kjaer Dual Signal Analyzer Type 2032, for example.

While this invention has been described in conjunction with specific embodiments thereof, it is evident that many alternatives, modifications and variations would be apparent to those skilled in the art.

For example, the invention could be modified to accommodate microphones that transmit signals optically over optical fibers instead of electrically over metal wires. In this case the feedthroughs 90 and 98 in the noise instrumentation channel would be replaced by fiber optic feedthroughs which provide an adequate seal against high vacuum. Accordingly, the preferred embodiments of the invention as set forth herein are intended to be illustrative, not limiting. Various changes may be made without departing from the spirit and scope of the invention as defined in the appended claims.

What is claimed is:

1. An apparatus for measuring thermal noise in a vibration free environment, comprising:
   an isolation vessel assembly comprising a vacuum-sealed outer vessel, a vacuum-sealed inner vessel and an interior suspension assembly between said outer and inner vessels for suspending said inner vessel within said outer vessel;
   a noise measurement system for recording thermal noise data from a microphone located in said inner vessel; and
   a vacuum system for creating a vacuum between an internal surface of said outer vessel and an external surface of said inner vessel.

2. An apparatus for measuring thermal noise according to claim 1, further comprising:
   an exterior suspension assembly coupled to said isolation vessel assembly for suppressing vibrations from the environment.

3. An apparatus for measuring thermal noise according to claim 1, wherein said noise measurement system comprises:
   a test microphone coupling located within said inner vessel for coupling with the microphone located in said inner vessel;
   noise measurement instrumentation located outside said inner vessel for recording the thermal noise data from the microphone located in said inner vessel; and
   a first electrical feedthrough assembly for electrically connecting said microphone coupling to said noise measurement instrumentation, wherein said electrical feedthrough assembly passes through said inner vessel to said noise measurement instrumentation.

4. An apparatus for measuring thermal noise according to claim 3, wherein said first electrical feedthrough assembly includes vacuum seals and electrical conducting components for conducting electrical signals from said microphone coupling to said noise measurement instrumentation.

5. An apparatus for measuring thermal noise according to claim 3, wherein said noise measurement instrumentation is located outside said outer vessel.

6. An apparatus for measuring thermal noise according to claim 1, further comprising a service system for monitoring pressure and temperature in said isolation vessel assembly.

7. An apparatus for measuring thermal noise according to claim 6, wherein said service system comprises:
   service sensors located within said inner vessel;
   service instrumentation located outside said inner vessel; and
   a second electrical feedthrough assembly for electrically coupling said service sensors to said service instrumentation.

8. An apparatus for measuring thermal noise according to claim 7, wherein said second electrical feedthrough assembly includes vacuum seals and electrical conducting components for conducting electrical signals from said service sensors to said service instrumentation.

9. An apparatus for measuring thermal noise according to claim 7, wherein said service instrumentation is located outside said outer vessel.

10. An apparatus for measuring thermal noise according to claim 7, wherein said service instrumentation is battery powered.

11. An apparatus for measuring thermal noise according to claim 1, wherein said interior suspension assembly comprises at least one suspension wire coupled between said outer vessel and said inner vessel.

12. An apparatus for measuring thermal noise according to claim 11, wherein said at least one suspension wire has a low resonant frequency to suppress vibrations transmitted from said outer wall.

13. An apparatus for measuring thermal noise according to claim 1, wherein said inner vessel has an electrically insulating liner.

14. An apparatus for measuring thermal noise according to claim 1, wherein said noise measurement system includes a test microphone coupling, and said inner vessel has an electrically insulated mounting member for mounting said test microphone coupling.

15. An apparatus for measuring thermal noise according to claim 1, wherein said inner vessel and said outer vessel are made of electrically conductive material and create a Faraday Cage which suppresses electromagnetic interference.

16. An apparatus for measuring thermal noise according to claim 1, wherein said outer vessel has a removable outer wall and said inner vessel has a removable outer wall.

17. A vibration and acoustic isolation vessel, comprising:
   an outer vessel;
   an inner vessel suspended within said outer vessel and being vacuum sealed, said inner vessel adapted to support a test microphone for use in recording thermal noise data in the inner vessel; and
   a vacuum system coupled to said outer vessel for creating a vacuum between said outer vessel and said inner vessel.

18. An isolation vessel according to claim 17 further comprising:
   a service system for monitoring pressure and temperature conditions in said inner vessel, said service system comprising condition sensors located within said inner vessel.

19. An isolation vessel according to claim 17, wherein said inner vessel and said outer vessel are electrically conductive to suppress electromagnetic interference.

20. An isolation vessel according to claim 17, further comprising a test microphone coupling in said inner vessel for coupling with the test microphone located in said inner vessel.

21. An isolation vessel according to claim 17, wherein said inner vessel is suspended by at least one suspension wire having a low resonant frequency to suppress vibrations transmitted from said outer vessel.

22. A method of measuring thermal noise in a microphone, comprising the steps of:
   mounting a test microphone in an inner vessel of an isolation vessel assembly;
   vacuum sealing the inner vessel;
   suspending the inner vessel within an outer vessel of the isolation vessel assembly and forming a chamber between an exterior surface of the inner vessel and an interior surface of the outer vessel;
   vacuum sealing the outer vessel;

evacuating the chamber between the inner and outer vessels; and measuring the thermal noise data in the microphone.

23. A method of measuring thermal noise in a microphone according to claim 22, wherein the chamber is evacuated to a vacuum of approximately no more than $10^{-5}$ Torr.

24. A method of measuring thermal noise in a microphone according to claim 22, further comprising monitoring pressure and temperature inside the inner vessel.

25. A method of measuring thermal noise in a microphone according to claim 22, wherein the inner vessel is vacuum-sealed with an inside pressure of approximately one atmosphere.

26. A method of measuring thermal noise in a microphone according to claim 22, wherein the step of monitoring the test microphone includes coupling an electrical feedthrough assembly from noise measurement instrumentation through the outer and inner vessels to a test microphone.

27. A method of measuring thermal noise in a microphone according to claim 22, further comprising a step of calibrating the microphone in situ prior to the step of vacuum sealing the inner vessel.

28. A method of measuring thermal noise in a microphone according to claim 27, wherein the step of calibrating the microphone includes removing outer walls of the inner and outer vessels and inserting the microphone into a calibrator to measure the output of the microphone.

* * * * *

UNITED STATES PATENT AND TRADEMARK OFFICE
CERTIFICATE OF CORRECTION

PATENT NO. : 5,146,780
DATED : September 15, 1992
INVENTOR(S) : ZUCKERWAR ET AL.

It is certified that error appears in the above-identified patent and that said Letters Patent is hereby corrected as shown below:

---In the drawings, Sheet 2, FIG. 2, the reference numeral 44 should be applied to the thermometer located on mounting post 46.

Signed and Sealed this

Second Day of November, 1993

Attest:

BRUCE LEHMAN

Attesting Officer

Commissioner of Patents and Trademarks